(12) United States Patent
Lafont et al.

(10) Patent No.: US 8,342,037 B2
(45) Date of Patent: Jan. 1, 2013

(54) DEVICE FOR MEASURING A PATTERN OF FORCES AND MOMENTS GENERATED BY AN AIRCRAFT PROPULSION SYSTEM

(75) Inventors: Laurent Lafont, Toulouse (FR); Herve Magnin, Flourens (FR); Jean-Michel Rogero, Pechbusque (FR)

(73) Assignee: Airbus Operations S.A.S., Toulouse (FR)

( * ) Notice: Subject to any disclaimer, the term of this patent is extended or adjusted under 35 U.S.C. 154(b) by 308 days.

(21) Appl. No.: 12/889,711

(22) Filed: Sep. 24, 2010

(65) Prior Publication Data

US 2011/0067501 A1    Mar. 24, 2011

(51) Int. Cl.
*G01L 1/22* (2006.01)
(52) U.S. Cl. .................... 73/862.045; 73/760
(58) Field of Classification Search ............... 73/760, 73/781, 826, 862.045
See application file for complete search history.

(56) References Cited

U.S. PATENT DOCUMENTS

| | | | |
|---|---|---|---|
| 2,520,923 A * | 9/1950 | Franzel et al. | 73/862.628 |
| 2,722,587 A * | 11/1955 | Buzzetti et al. | 338/2 |
| 3,527,088 A | 9/1970 | Weekley | |
| 5,065,959 A | 11/1991 | Bhatia et al. | |
| 5,170,662 A | 12/1992 | Brault et al. | |
| 5,938,149 A * | 8/1999 | Terwesten | 244/118.5 |
| 6,604,710 B2 * | 8/2003 | Ohmer et al. | 244/119 |
| 2005/0081531 A1 | 4/2005 | Stretton et al. | |
| 2009/0090811 A1 | 4/2009 | Llamas | |

OTHER PUBLICATIONS

International Search Report, dated Apr. 28, 2010, from corresponding French application.

* cited by examiner

*Primary Examiner* — Max Noori
(74) *Attorney, Agent, or Firm* — Young & Thompson

(57) ABSTRACT

A device for measuring a pattern of the forces and moments (2) generated by an aircraft propulsion system (1), includes a hooking structure (5) that can support at least one propulsion system (3). This hooking structure (5) passes through the fuselage transversely relative to the main axis of the fuselage of the aircraft via an opening, whereby the structure has at least a first part (AC) that is found on the outside of the aircraft connected to a propulsion system, and a second part (CB) that is found on the inside of the aircraft that is connected to structural elements of the aircraft via an isostatic system of connecting elements (9, 10, 12, 14, 15, 22) so as to take up the six degrees of freedom, measuring elements being integrated in the connecting elements to reconstitute the pattern.

12 Claims, 5 Drawing Sheets

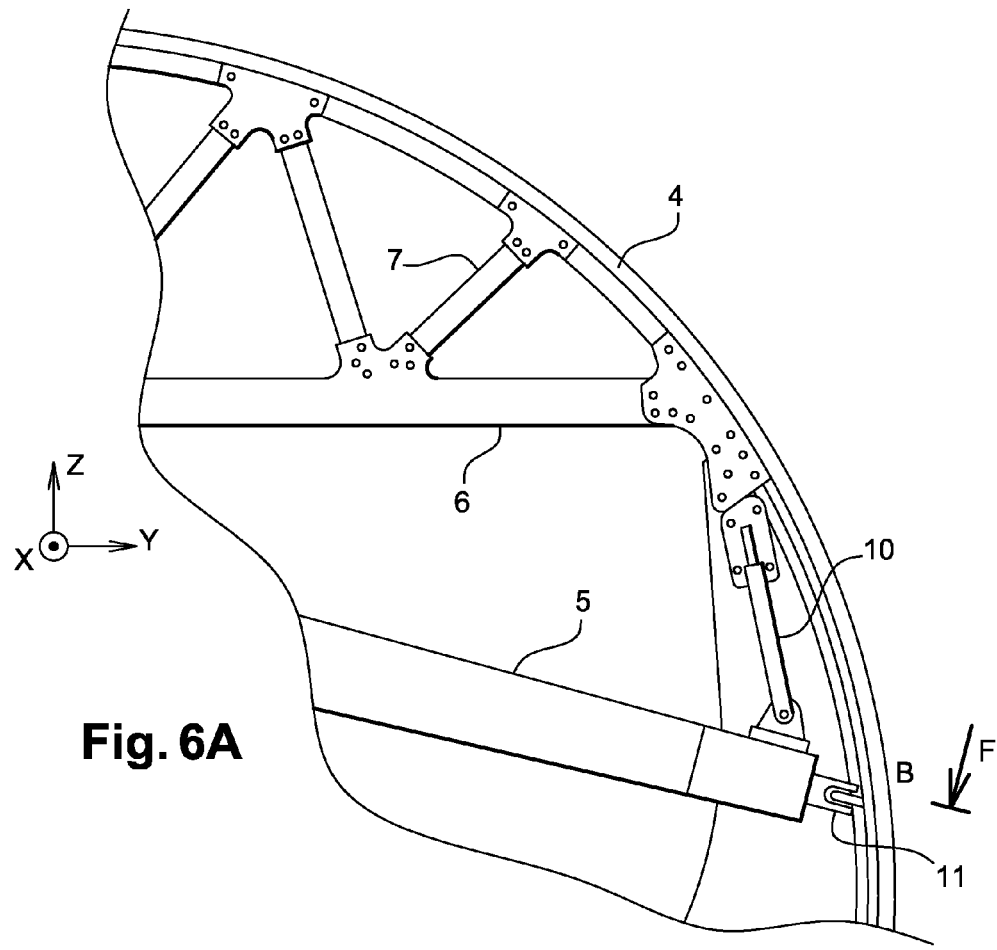
Fig. 6A
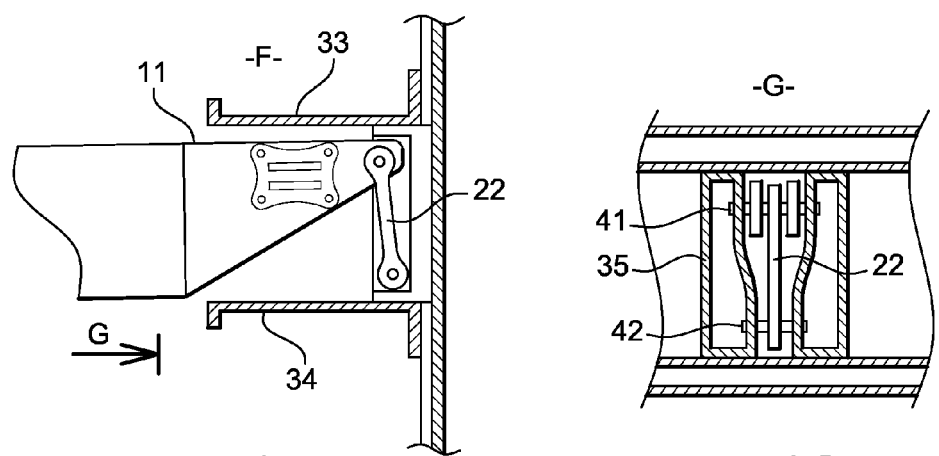
Fig. 6B     Fig. 6C

DEVICE FOR MEASURING A PATTERN OF FORCES AND MOMENTS GENERATED BY AN AIRCRAFT PROPULSION SYSTEM

This invention relates to a device for measuring a complete pattern of mechanical actions including the forces as well as the moments generated by an aircraft propulsion system.

Such a device for measuring forces is particularly designed for the field of aeronautics for determining as precisely as possible the forces and moments generated by the engine so as to determine the thrust of the latter as well as other forces and moments induced by the operation of the engine.

On existing aircraft, the engines are either suspended below the wing by a hooking structure or hooked laterally to a mast attached to the fuselage. This hooking structure is also called a hooking mast or pylon. In a known way, this pylon exhibits a rigid primary structure that forms a box, i.e., constituted by the assembly of longitudinal beams connected to one another by a large number of transverse ribs.

The structural connection between the engine and the pylon structure is generally implemented by a front fastener that is arranged at the tip of a pyramid, a rear fastener, and a force uptake device equipped with lateral uptake connecting rods. The pyramid makes it possible to move the engine forward relative to the wing of the aircraft.

This hooking structure therefore has the main function of hooking the engine relative to a wing element or fuselage element while enabling an uptake of the thrust forces. Within the framework of a flight test-bed, also called "Flying Test Bed" in English, it is known to equip this hooking structure with instruments to measure the thrust of the engine. More specifically, the connecting rods of the hooking device between the engine and the mast are equipped with strain gauges for measuring a force generated by the engine during operation and transmitted to the measuring system by means of these connecting rods.

Sensors for measuring movement are therefore arranged between the engine and the pylon.

The overall set of engine fasteners should in principle ensure an isostatic mounting, which makes it possible to avoid prestresses. Because of the small amount of space available for the engine fasteners, the connecting elements such as connecting rods are generally short in length while being heavily loaded. A significant portion of the forces is therefore dissipated in friction, which thus reduces the precision of the measurements of the forces.

Furthermore, the strain gauges are mounted in connecting rods that are very close to the engine and are thereby carried at a high temperature. The strain gauges that are used, however, generally have a heat tolerance that is limited to 180°; the fact of developing in a relatively hostile thermal environment greatly reduces their service life. In addition, the thermal effects, despite the different compensation techniques, induce a loss of precision in the measurements.

This invention therefore proposes a device for measuring a complete pattern of forces (the forces along the three axes) as well as the moments generated by an aircraft propulsion system. Propulsion system is defined as a system that comprises the engine, its nacelle, as well as the associated systems such as the oil cooling system that can be installed either on one of these two parts or on the pylon. To do this, this device comprises a new form of pylon that passes through the fuselage transversely; this hooking structure exerts the function of a lever arm of which one end of the part that is found on the outside of the aircraft is connected to a propulsion system and one part that is found on the inside of the aircraft is connected isostatically to structural elements of the aircraft, such as the fuselage or the floor by means of the connecting elements. The principle of the invention is to install measurement sensors on these connecting elements. Thus, this configuration that allows the implementation of an isostatic interface between the pylon and the elements of the structure of the aircraft by means of the connecting elements makes it possible thus to reconstitute the complete pattern of the forces and moments generated by the propulsion system as well as the pylon.

By this new form of hooking structure, the measuring device that is proposed in this invention also makes it possible to remove the strain gauges from the engine zone and to place them in a moderate and more stable thermal environment for their operation. It is no longer necessary to produce a thermal compensation for taking into account the effects due to thermal deformations. This consequently makes it possible to reduce the errors induced by the thermal phenomena.

In addition, the fact of installing these connecting elements inside the aircraft allows the use of the connecting elements with a more significant length than at the engine fasteners, thus making it possible to improve the measuring precision.

The use of the long connecting elements makes it possible to greatly reduce the pathways of parasitic forces but it does not make it possible to eliminate them totally; the measuring precision can be improved by introducing on the connecting elements a measurement of the moment generated in the connecting element due to the effects of friction at the different junctions, the measurement of the moment then being used so as to characterize the pathways of parasitic forces.

During flight, the aircraft being subjected to acceleration variations as well as to attitude changes inducing significant disruptions of the measurement, the acceleration vector consists, on the one hand, of gravity, and, on the other hand, of other forces acting on the aircraft. The measurement of the acceleration vector is linked to the knowledge of the mass of the system suspended by connecting elements. The measurement of the forces in these connecting elements simultaneously with the measurement of the acceleration vector makes it possible to correct the measurement of the pattern of the forces of the effects linked to the acceleration so as to obtain the measurement of the forces induced by the operation of the propulsion system, in particular the thrust forces in the main axis of the propulsion system as well as the other forces and moments generated by the propulsion system. As a result, the measuring device makes it possible to increase the precision of the measurement during stabilized phases of the aircraft and to allow a measurement during non-stabilized phases. Preferably, this measurement of the three axes of the acceleration vector is carried out close to the center of gravity of the suspended system, and it should be carried out simultaneously with the measurement of the forces.

Here, suspended system is defined as the propulsion system and the pylon.

The object of the invention is therefore to produce a device for measuring a pattern of the forces and moments generated by an aircraft propulsion system, whereby said device comprises a hooking structure that can support at least one propulsion system.

According to the invention, this hooking structure passes through the fuselage transversely relative to the main axis of the fuselage of the aircraft via an opening, whereby said structure has at least a first part (AC) that is found on the outside of the aircraft connected to a propulsion system, and a second part (CB) that is found on the inside of the aircraft that is connected to structural elements of the aircraft via an isostatic system of connecting elements so as to take up the six degrees of freedom, measuring means being integrated in said elements to reconstitute said pattern.

According to another embodiment of the invention, the hooking structure is connected to the structural elements of the aircraft by an overall set of six connecting rods.

According to one embodiment of the invention, the hooking structure is connected to frames of the fuselage of the aircraft.

According to another embodiment of the invention, the hooking structure is connected to the floor of the aircraft by means of a reinforcement structure.

Advantageously, the hooking structure is connected to the aircraft by means of an overall set of safety connections so as to create redundant force pathways, whereby this overall safety connecting set is configured in such a way that the pathways of the safety forces are not normally in contact.

This safety connection comprises at least one projection or a housing arranged on the structural elements of the aircraft; the hooking structure comprises at least one corresponding housing or projection, whereby said projections and said corresponding recesses work together in such a way that the projection is never in contact with the walls of the housing when the main connection between the hooking structure and the structural elements of the aircraft is in its field of functional operation.

According to one embodiment of the invention, the ends of the connecting elements are equipped with ball joints to ensure the connection with the structural elements of the aircraft.

According to one embodiment of the invention, the measuring means are strain gauges that measure the forces in the main axis of the propulsion system.

According to one embodiment of the invention, at least one of the connecting elements that connect the hooking structure to the aircraft uses a means for measuring the flexion moment generated in the connecting elements.

According to one embodiment of the invention, the means for measuring the moment consist of at least two strain gauges.

Advantageously, the measuring device comprises an accelerometer that can implement the measurement of the acceleration vector. Preferably, this accelerometer is positioned so as to be close to the center of gravity of the suspended unit.

In different possible embodiments, the invention is described in more detail with reference to the accompanying drawings in which:

FIG. 1 diagrammatically shows an aircraft that is equipped with a device for measuring a pattern of the forces and moments generated by a propulsion system according to the invention;

FIG. 6A is an enlarged view of the zone (B) that shows the end of the part of the hooking structure that is found on the inside of the aircraft, connected to the frame of the fuselage;

FIG. 6B shows a cutaway view of FIG. 6A along a cutting plane F; and FIG. 6C shows a cutaway view of FIG. 6B along a cutting plane G.

Figure 1:
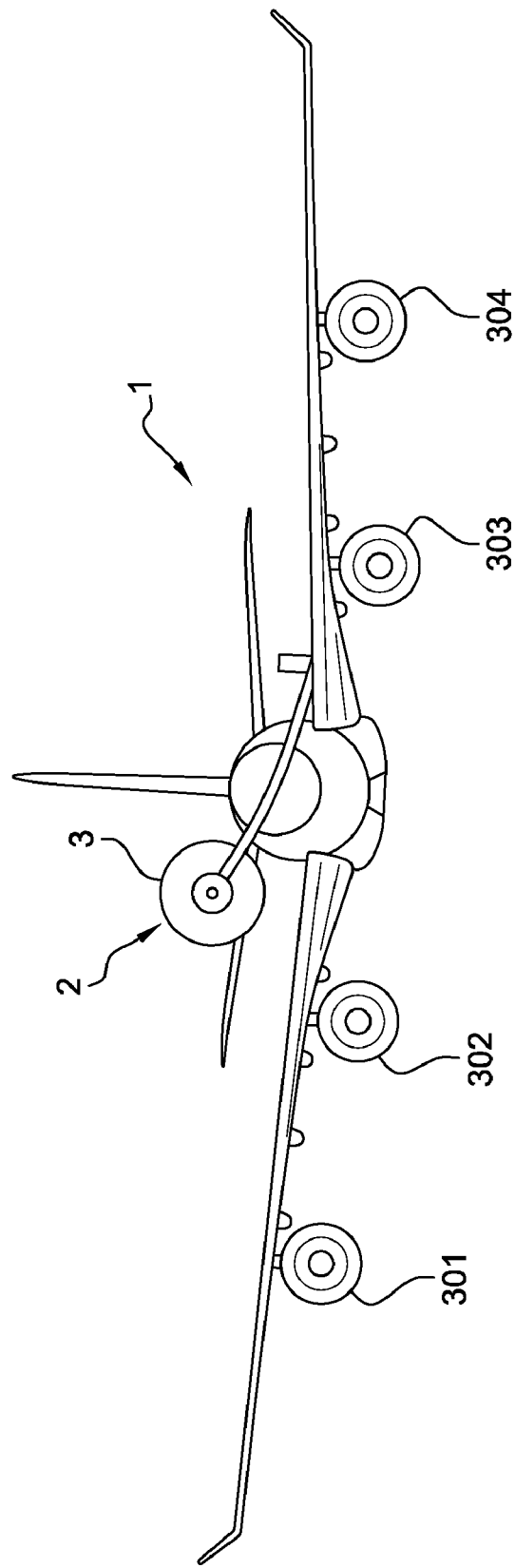

FIG. 1 diagrammatically shows an aircraft 1 that is equipped with a device 2 for measuring a pattern of forces and moments generated by a propulsion system 3 according to the invention. This device can be used during a test flight of the aircraft or when the aircraft is on the ground. This aircraft is equipped with four engines 301, 302, 303 and 304 that are suspended under the wing of the aircraft. In addition to these four engines for ensuring the flight of the aircraft, the latter, by way of example, comprises here an additional propulsion system that comprises an engine, its nacelle, as well as the systems that are installed on one of these two parts or on the associated pylon.

Figure 2:
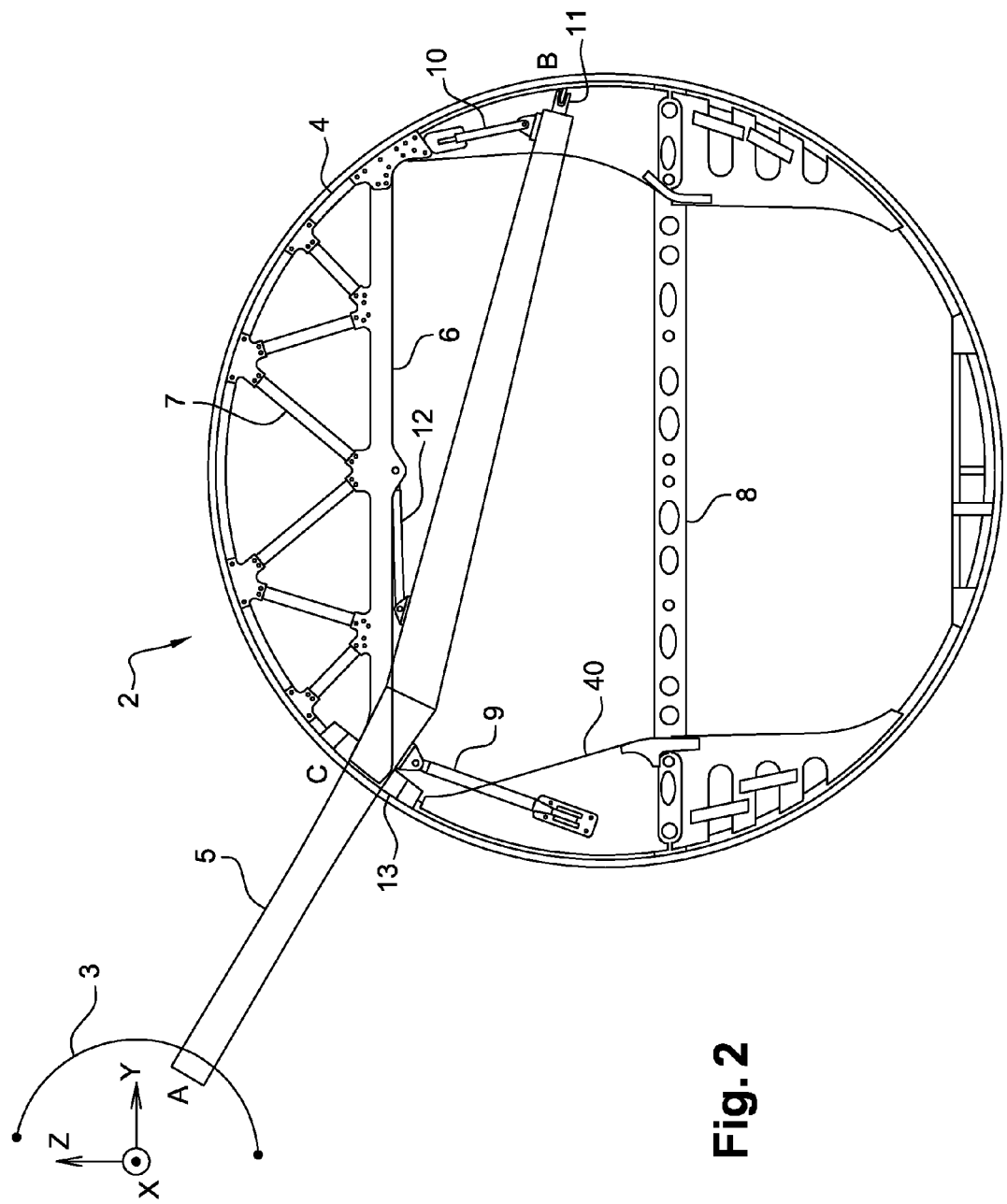
FIG. 2 is a diagrammatic cutaway view of an embodiment of the measuring device that supports a single propulsion system, whereby said device comprises a hooking structure that is connected to structural elements of the fuselage by means of six connecting rods.

FIG. 2 shows an embodiment of the measuring device and more precisely its arrangement relative to an aircraft. It comprises a hooking structure 5 that has a part (AC) that is found on the outside of the aircraft and a part (CB) that is found on the inside of the aircraft. The end that is referred to as A of the outside part is connected to a propulsion system 3. This structure passes through the fuselage at point C via an opening that is made in the skin of the fuselage 4, whereby the structure is arranged transversely relative to the longitudinal axis of the fuselage (OX) that is also the longitudinal axis of the engine. The opposite end of the structure 5 that is referred to as B is connected to a structural element of the fuselage.

To analyze the forces that are transmitted by the measuring device, an orthonormed reference point (OXYZ)—in which the OX axis, directed toward the front, is oriented along the longitudinal axis of the engine, the OY axis is oriented laterally in a horizontal plane, and the OZ axis is oriented vertically upward—is assigned to the propulsion system. Relative to this reference point, the thrust forces of the engine 3 are oriented along the OX axis.

According to the invention, this hooking structure 5 of the measuring device that is inserted between the engine 3 and the fuselage plays the role of pylon. Contrary to the conventional pylon that is located in a very small space between the engine and the wing, the hooking structure that is illustrated in FIG. 2 passes through the fuselage transversely at point C, having a part (AC) that is located on the outside of the aircraft and another part (CB) that is located on the inside of the aircraft. The end of the part (AC) supports a propulsion system 3.

According to an alternative embodiment of the invention that is not illustrated, the hooking structure can comprise two parts that are located on the outside of the aircraft and that are arranged on both sides of the aircraft, of which each of the ends supports a propulsion system and a central part located on the inside of the aircraft.

The part (CB) that is found on the inside of the aircraft is connected to structural elements of the aircraft by means of an isostatic system of connecting elements. The principle of the measuring device of the invention is therefore to equip these force uptake elements with instruments to reconstitute the pattern of the forces and moments. The expression "to equip the connecting rod with instruments" is defined as the mounting of a sensor for measuring deformation, such as a strain gauge.

According to this first embodiment, these force uptake elements consist here of an overall set of 6 connecting rods each taking up one degree of freedom. The measurement is made by means of each of these connecting rods.

FIG. 2 shows that a part of the hooking structure is connected respectively to reinforcement elements 6, 7, 40 of the fuselage by connecting rods 9, 10, 12. These reinforcement elements 6, 7, 40 are attached to the fuselage by known mechanical attachments such as holding clips and to the floor 8 of the aircraft. The end B of the hooking structure 5 is connected to the fuselage by a connecting-rod-type fastener 11, as illustrated in FIG. 2. The point C of the structure is also connected by means of two connecting rods of which a more detailed description will be given with reference to FIGS. 4 and 5.

Figure 3:
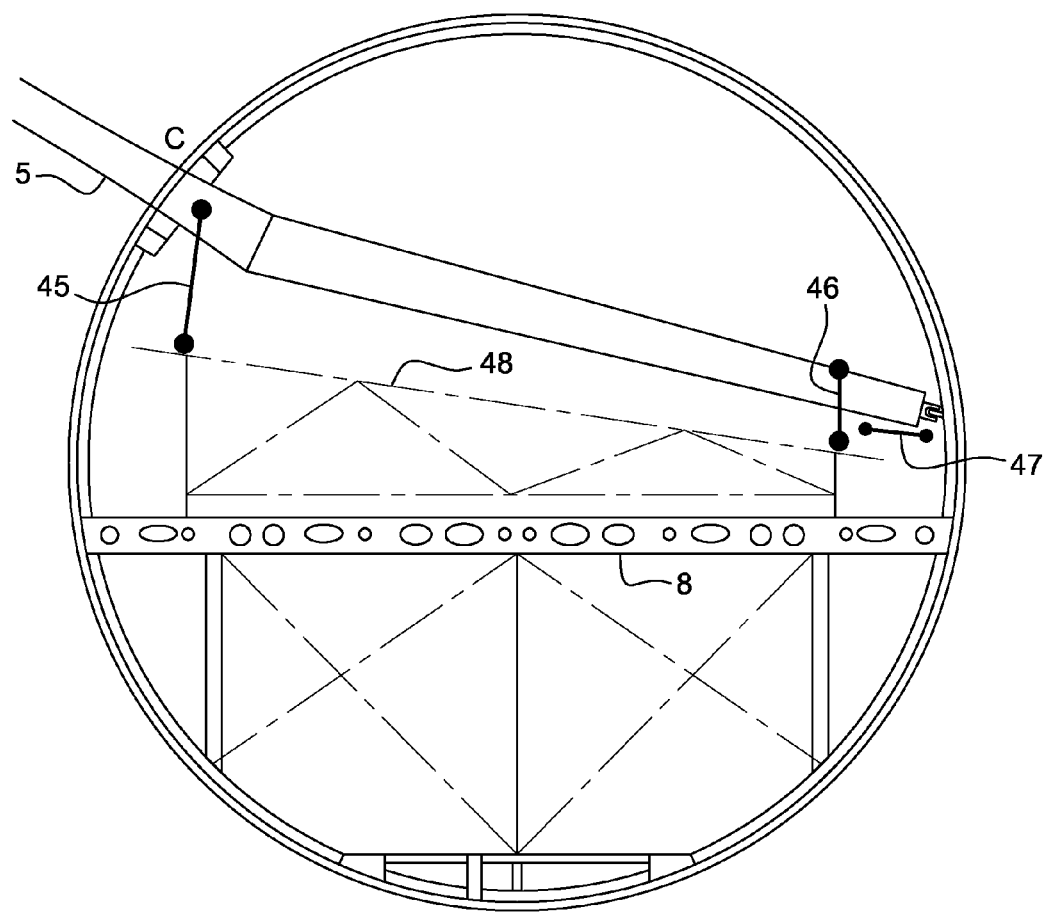
FIG. 3 is a diagrammatic cutaway view of a second embodiment of the measuring device in which the hooking structure is connected to the floor via a reinforcement structure.

FIG. 3 shows an alternative embodiment of the invention for the connection of the hooking structure 5 to the aircraft in which the six connecting rods are connected to the floor 8 of the aircraft by means of a reinforcement structure 48. By way of illustration, FIG. 3 shows only the connection of three of the six connecting rods 45, 46, 47 to the floor.

Figure 4:
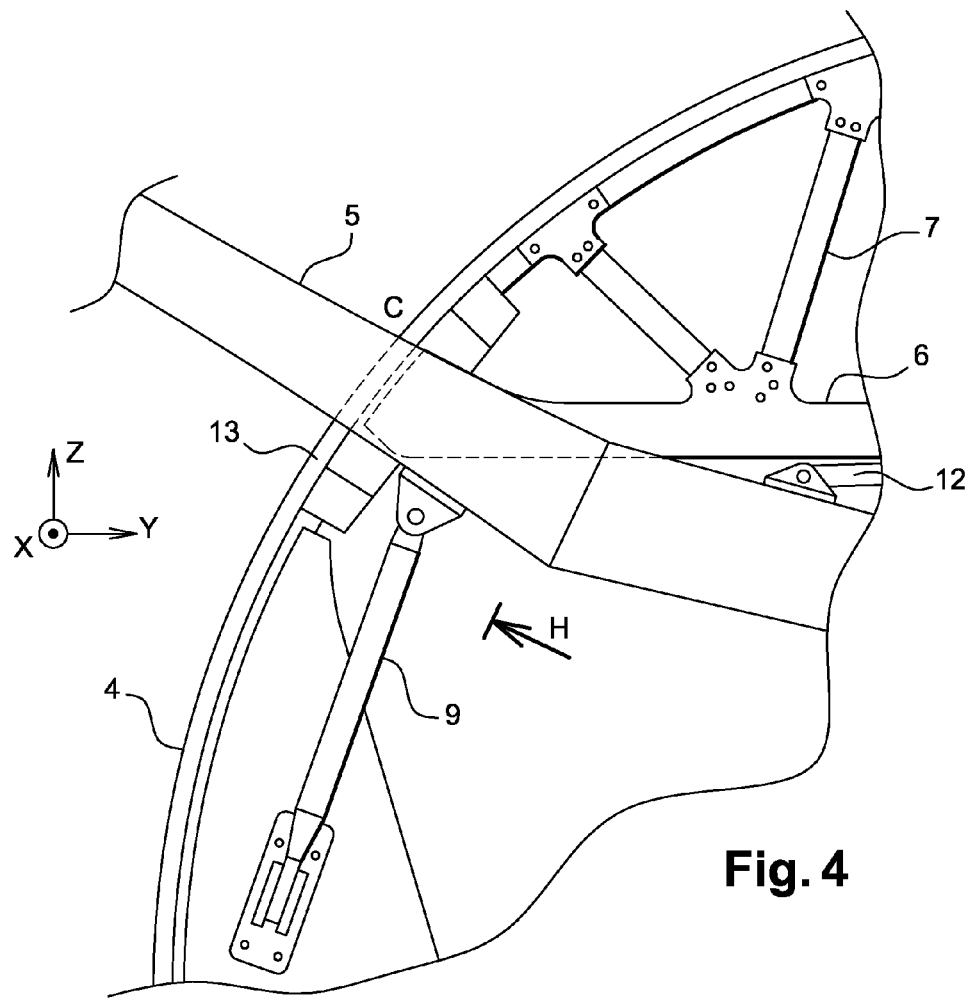
FIG. 4 is an enlarged view of the zone (C) that shows the hooking structure of the measuring device shown in FIGS. 2 and 3 that passes through the fuselage.
Figure 5:
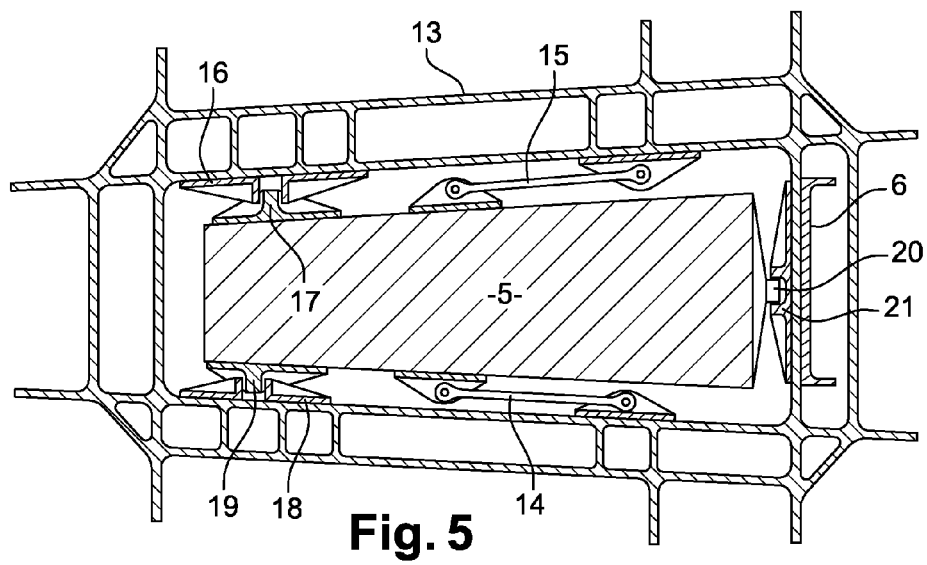
FIG. 5 is a cutaway view of FIG. 4 along the cutting plane H.

FIGS. 4 and 5 illustrate in more detail the structure and the arrangement of the connecting point C of the hooking structure 5 relative to the fuselage.

The point C of the hooking structure 5 is connected to the fuselage by means of a reinforcement frame 13. An opening is therefore made in the skin of the fuselage to accommodate this reinforcement frame 13. This frame 13 that is typically riveted to the skin of the fuselage should also withstand mechanical stresses such as the loads due to the flexion of the fuselage. In particular, this reinforcement frame 13 is attached to the fuselage as well as to a cross-piece 6 of the fuselage.

FIG. 5 shows a cutaway view along the plane H of such a reinforcement frame 13 that is designed to be mounted on the skin of the fuselage (not shown) that is connected to the structure. The connection between the structure 5 and the frame 13 is made by means of two connecting rods 14, 15 that are arranged between the reinforcement frame 13 and the hooking structure 5.

Taking into account its vital function in the hooking function, the structure 5 is connected to the aircraft of a second overall set of safety connections able to create a second pathway for directing the force. In this way, when the connecting rods of the main connection can no longer ensure their function in the field of functional operation, the connecting rods of the safety connections replace them.

One example of a safety connection is illustrated in FIG. 5; this safety connection is inserted between the frame 13 and the hooking structure 5. This safety connection comprises three housings 16, 18, 20 that are arranged on the longitudinal sides of the frame 13 along the axis (OX) and the vertical side of the frame along the axis (OZ). The hooking structure comprises three corresponding projections 17, 19, 21 that penetrate with play into the housings. More specifically, between the circumferential walls of the projections 17, 19, 21 and housings 16, 18, 20, play exists such that the walls never come into contact with one another when the main connection is functional, namely the connecting rods 14, 15 of the main connection.

Thus, this safety connection makes it possible to take over the relay of the main connection when, for example, one of the connecting rods of the connection is broken or when the main connection is no longer its field of functional operation.

This safety connection can also be calibrated in such a way that it performs the function of a limiter so as to limit the operation of the connecting rods only in a determined range of measurements. By way of example, it is possible, for example, to limit the operation of the connecting rods 14, 15 only when the aircraft that is flying the test flight is in cruise regime.

FIGS. 6A, 6B and 6C illustrate in more detail the connection between the end 11 of the hooking structure and the fuselage. More specifically, as FIG. 6B illustrates it by a cutaway view along a cutting plane F of FIG. 6A, the connecting rod 22 that ensures this connection is arranged between two stop elements 33, 34 for limiting the movement of the end along the longitudinal axis (OX). The end 11 of the shaft can therefore articulate between the two stop elements 33, 34 by means of the connecting rod 22. This connecting rod is also equipped with instruments for the measurements of forces.

FIG. 6C shows—a cutaway view along a cutting plane G of FIG. 6B—the attachment of this connecting rod 22 to the fuselage. The connecting rod is connected to an attachment part 35 by means of two axes 41, 42. This connecting rod can articulate at its two ends. The attachment part is made integral on the fuselage by known mechanical attachments.

The invention claimed is:

1. Device for measuring a pattern of the forces and moments (2) generated by an aircraft propulsion system (1), whereby said device comprises a hooking structure (5) that can support at least one propulsion system (3), characterized in that this hooking structure (5) passes through the fuselage transversely relative to the main axis of the fuselage of the aircraft via an opening, whereby said structure has at least a first part (AC) that is found on the outside of the aircraft connected to a propulsion system, and a second part (CB) that is found on the inside of the aircraft that is connected to structural elements of the aircraft via an isostatic system of connecting elements (9, 10, 12, 14, 15, 22) so as to take up the six degrees of freedom, measuring means being integrated in said connecting elements to reconstitute said pattern.

2. Device according to claim 1, wherein said connecting elements consist of an overall set of six connecting rods (9, 10, 12, 14, 15, 22).

3. Device according to claim 1, wherein the hooking structure (5) is connected to frames of the fuselage of the aircraft.

4. Device according to claim 1, wherein the hooking structure (5) is connected to the floor (8) of the aircraft by means of a reinforcement structure (48).

5. Device according to claim 1, wherein the hooking structure (5) is connected to the aircraft by means of an overall set of safety connections so as to create redundant force pathways, whereby this overall safety connection set is configured in such a way that the pathways of the forces are not in contact.

6. Device according to claim 5, wherein the safety connection comprises at least one projection (17, 19, 21) or a housing (16, 18, 20) that is arranged on the structural elements of the aircraft; the hooking structure comprises at least one corresponding housing or projection, whereby said projections and said corresponding recesses work together in such a way that the projection is never in contact with the walls of the housing when the main connection between the hooking structure and the structural elements of the aircraft is in its field of functional operation.

7. Device according to claim 1, wherein the ends of the connecting elements are equipped with ball joints.

8. Device according to claim 1, wherein the measuring means that is integrated in at least one of the connecting elements that connects the hooking structure to the aircraft consists of at least one strain gauge that measures the forces in the main axis of the propulsion system.

9. Device according to claim 1, wherein at least one of the connecting elements that connects the hooking structure to the aircraft uses a means for measuring the flexion moment generated in said connecting element.

10. Device according to claim 1, wherein the means for measuring the moment generated in said connecting element consists of at least two strain gauges.

11. Device according to claim 2, wherein the hooking structure (5) is connected to frames of the fuselage of the aircraft.

12. Device according to claim 2, wherein the hooking structure (5) is connected to the floor (8) of the aircraft by means of a reinforcement structure (48).

* * * * *